Figure 1:
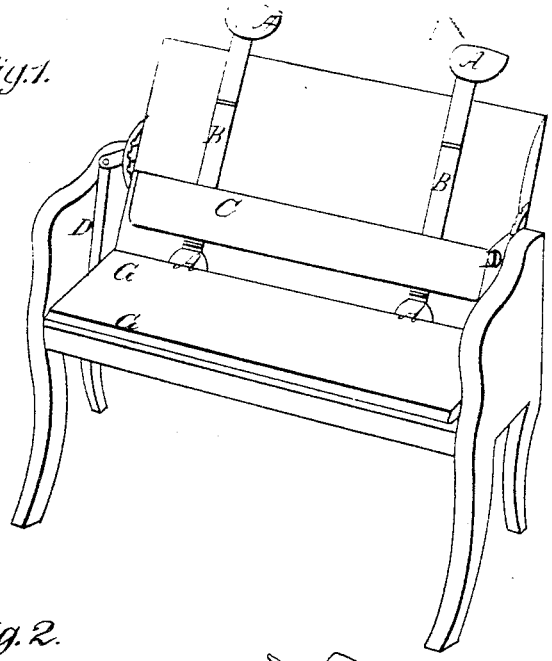
Figure 2:
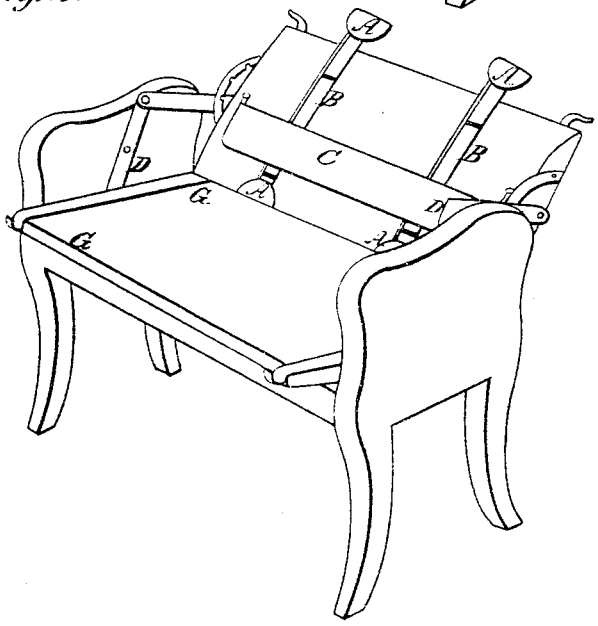

BEST AVAILABLE COPY

A. M. Holmes.

Car Seat.

No. 214. A. I. Dec. 21, 1858.

1271

Witnesses

F. T. Mayberry

N. B. Bacon

Inventor.

Alex M. Holmes

H. PETERS, PHOTO-LITHOGRAPHER, WASHINGTON, D. C.